United States Patent [19]
Francis

[11] Patent Number: 5,977,952
[45] Date of Patent: Nov. 2, 1999

[54] METHOD AND SYSTEM FOR AN AMBIDEXTROUS MOUSE

[75] Inventor: Larry Douglas Francis, Raleigh, N.C.

[73] Assignee: International Business Machines Corporation, Armonk, N.Y.

[21] Appl. No.: 08/960,191

[22] Filed: Oct. 29, 1997

[51] Int. Cl.$^6$ .................................................. G09G 5/08
[52] U.S. Cl. .......................... 345/163; 345/156; 345/157; 345/145; 345/168; 345/165; 345/166
[58] Field of Search ..................................... 345/145, 146, 345/163–166, 157, 158, 156, 168–172

[56] References Cited

U.S. PATENT DOCUMENTS

| | | | |
|---|---|---|---|
| 4,987,411 | 1/1991 | Ishigami | 345/159 |
| 5,432,510 | 7/1995 | Matthews | 341/20 |
| 5,635,954 | 6/1997 | Yamada | 345/157 |
| 5,648,798 | 7/1997 | Hamling | 345/163 |
| 5,841,425 | 11/1998 | Zenz, Sr. | 345/163 |
| 5,898,432 | 4/1999 | Pinard | 345/334 |

*Primary Examiner*—Richard A. Hjerpe
*Assistant Examiner*—Henry N. Tran
*Attorney, Agent, or Firm*—Edward H. Duffield; Andrew J. Dillon

[57] ABSTRACT

A method and system in a computer system having a display and a keyboard for automatically adjusting a pointing device to accommodate both left-handed and right-handed users, wherein the pointing device is utilized in association with a graphical user interface displayed within the computer system. Initially, the location of the pointing device with respect to a central location is electronically determined. The graphical user interface is subsequently automatically altered to indicate a left-handed pointing device preference, if the pointing device is located to the left of the central location. Likewise, the graphical user interface is automatically altered to indicate a right-handed pointing device preference, if the pointing device is located to the right of the central location. The pointing device can comprise a mouse, and the central location can be identified as the keyboard or the display. In addition, the location of the mouse with respect to the central location can be electronically determined via microwave, infrared, optical, radio frequency or magnetic techniques.

21 Claims, 6 Drawing Sheets

METHOD AND SYSTEM FOR AN AMBIDEXTROUS MOUSE

BACKGROUND OF THE INVENTION

1. Technical Field

The present invention relates in general to improved information processing systems. In particular, the present invention relates to improved graphical user interfaces utilized in association with such information processing systems. Still more particularly, the present invention relates to improved pointing devices which can be utilized in accordance with graphic user interfaces, such as a mouse pointing device, which may be a wireless or wireline mouse.

2. Description of the Related Art

A graphical user interface is a type of display format which enables a user to choose commands, start programs, and see lists of files and other options by pointing to pictorial representations and lists of menu items on a computer display screen. Choices can generally be activated by either a keyboard or a pointing device. A pointing device is a type of input device utilized to control on-screen cursor actions such as "pressing" on-screen buttons, and selecting ranges of cells in spreadsheets or groups of words in a document. Pointing devices are often utilized to create drawings or graphical shapes. The most commonly utilized pointing device known today is a so-called "mouse."

A mouse is a commonly utilized pointing device, containing one or more buttons, that allows a user to interact with a product or operating environment such as a graphical user interface. A mouse typically includes a casing with a flat bottom. The mouse is designed to be gripped by one hand, and includes one or more buttons on the top of the mouse and a multidirectional detection device, usually shaped like a ball, on the bottom of the mouse. A cable typically connects the mouse to a computer. By moving the mouse on a surface such as a desk or mouse pad, a user can control an on-screen cursor. Because there are no defined limits to the mouse's movement and because the placement of the mouse on a surface does not map directly to a specific screen location, the mouse is considered to be a relative pointing device. Thus, to select items or choose commands on the screen, the user presses one of the mouse's buttons, producing a so-called mouse "click."

The user can interact with on-screen graphical elements via the mouse. The mouse controls a mouse pointer, which is a type of on-screen graphical element utilized by the mouse. The mouse pointer is displayed on a computer monitor screen such that its location on-screen changes as the user moves the mouse. Depending on the location of the mouse pointer and the operation of the program (i.e., the graphical user interface within which the mouse pointer is displayed), the area of the screen where the mouse pointer appears serves as the target for an action when the user presses one of the mouse buttons.

Some conventional graphical user interfaces provide a cursor and scroll bar for scrolling through portions of a viewable object. A viewable object can contain multiple components such as spreadsheets, text, hotlinks, pictures, sound, and video also. However, a viewable object is not limited to these components. In many types of graphical user interfaces, a vertical or horizontal bar at the side or bottom of a graphical user interface window can be utilized in conjunction with the mouse to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

In utilizing a mouse to interact with a graphical user interface via mouse pointers and viewable objects, users who are left-handed often have difficulty utilizing a mouse that has been previously designated a right-handed mouse. Although it is not terribly difficult to switch a mouse between left- and right-handedness, a mouse in the wrong handedness presents a significant nuisance to the user. A left-handed person often feels uncomfortable altering a right-handed person's computer settings from a right-handed mouse to a left-handed mouse. Left-handed users in particular, when borrowing a computer having a mouse are likely to forget to reset the mouse preference, which takes time and can often be a frustrating task.

Likewise, individuals who are right-handed and attempt to install software or fix problems on a computer that has been previously designated as a left-handed computer via the mouse, can find it frustrating to make the repairs or install the software or may even conclude that the computer is working improperly simply because the mouse does not perform as expected. In situations where computers are shared (e.g., laboratories, homes, public kiosks, etc.), the frequency with which a user desires to switch a mouse preference is even higher.

Although nearly every operating system allows users to alter mouse preferences, many operating systems also allow users to hide the dialog boxes that allow users to access the mouse preference. Such situations are commonly encountered in "demo" scenarios, where a particular product is demonstrated via a graphical user interface. A salesman, for example, might hand the system to a customer to demonstrate the product and when the left-handed or right-handed customer finds that the mouse has been set to an opposite setting, the customer quickly loses his or her enthusiasm for the product simply because the mouse will not operate properly due to their left- or right-handedness.

From the foregoing, it can be seen that a need exists for a mouse which would automatically alleviate the problems faced by left- or right-handed users in utilizing a mouse having an opposite "preferences" setting (i.e., an ambidextrous mouse). Such a mouse, if implemented, would prevent the frustration and time in altering mouse preferences, and would also in particular benefit left-handed users.

SUMMARY OF THE INVENTION

It is an object of the present invention to provide an improved information processing system.

It is another object of the present invention to provide for improved information processing systems in which graphical elements can be manipulated by computer users via pointing devices.

It is yet another object of the present invention to provide for an improved pointing device that can be efficiently and rapidly accessed by either left-handed or right-handed users.

The above and other objects are achieved as is now described. A method and system are disclosed in a computer system having a display and a keyboard for automatically adjusting a pointing device to accommodate both left-handed and right-handed users, wherein the pointing device is utilized in association with a graphical user interface displayed within the computer system. Initially, the location of the pointing device with respect to a central location is electronically determined. The graphical user interface is subsequently automatically altered to indicate a left-handed pointing device preference, if the pointing device is located to the left of the central location. Likewise, the graphical user interface is automatically altered to indicate a right-handed pointing device preference, if the pointing device is located to the right of the central location. The pointing device can comprise a mouse, and the central location can be identified as the keyboard or the display. In addition, the location of the mouse with respect to the central location can be electronically determined via microwave, infrared, optical, radio frequency or magnetic techniques.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
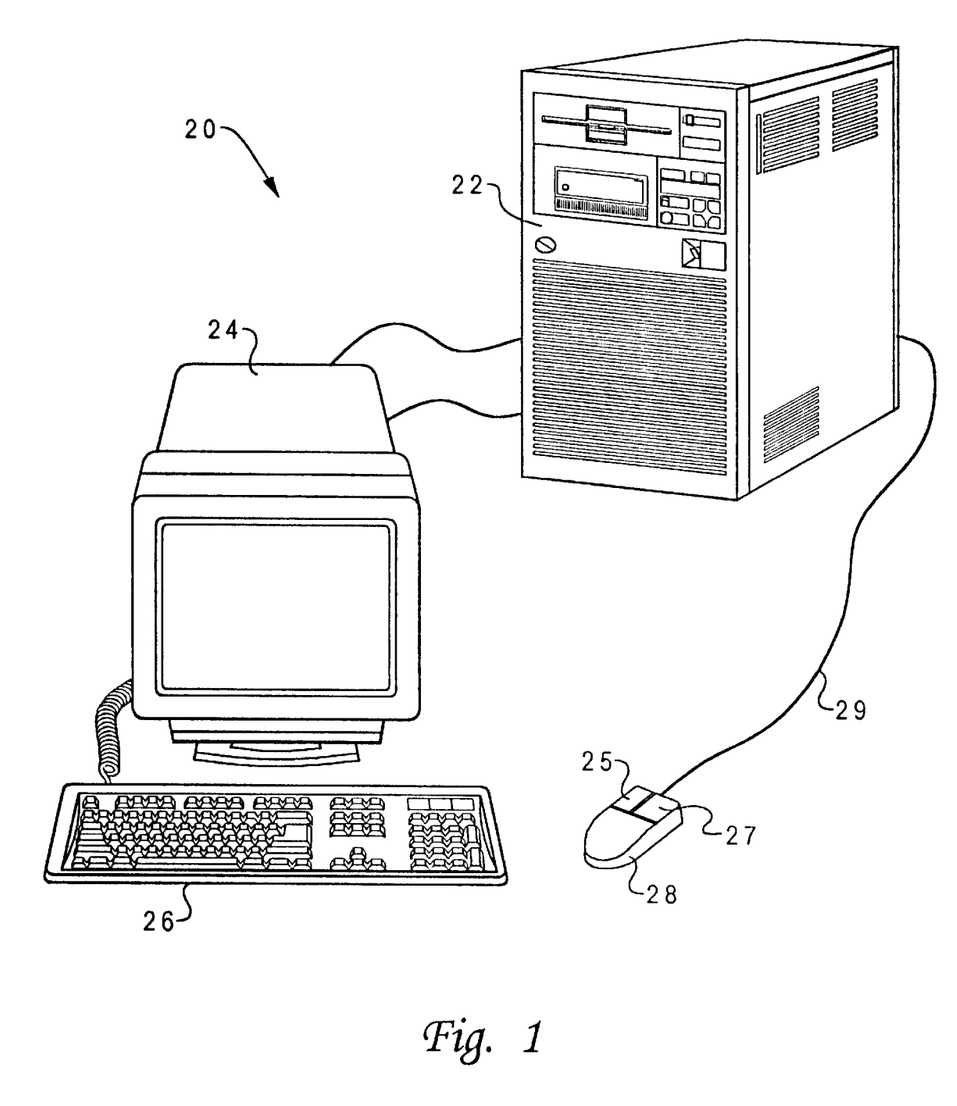
FIG. 1 illustrates a pictorial representation of a computer system which may be utilized to implement a preferred embodiment of the present invention.

With reference now to the figures and in particular with reference to FIG. 1, there is depicted a pictorial representation of a computer system which may be utilized to implement a preferred embodiment of the present invention. A computer system 20 is depicted that includes a system unit 22, a video display unit 24, a keyboard 26, and a mouse 28. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display unit 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display unit 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. As is depicted, mouse 28 may include a left button 25 and a right button 27, each of which may be depressed or "clicked," to provide command and control signals to computer system 20. A cable 29 can connect mouse 28 to a computer such as computer system 20. Cable 29, however, is not a necessary feature of the present invention. Those skilled in the art will appreciate that other communication devices may be utilized in accordance with mouse 28 to allow mouse 28 to communicate with system unit 22. For example, mouse 28 may communicate with system unit 22 via infrared communication techniques, well known in the art of computer systems such as computer 20.

By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons.

Figure 2:
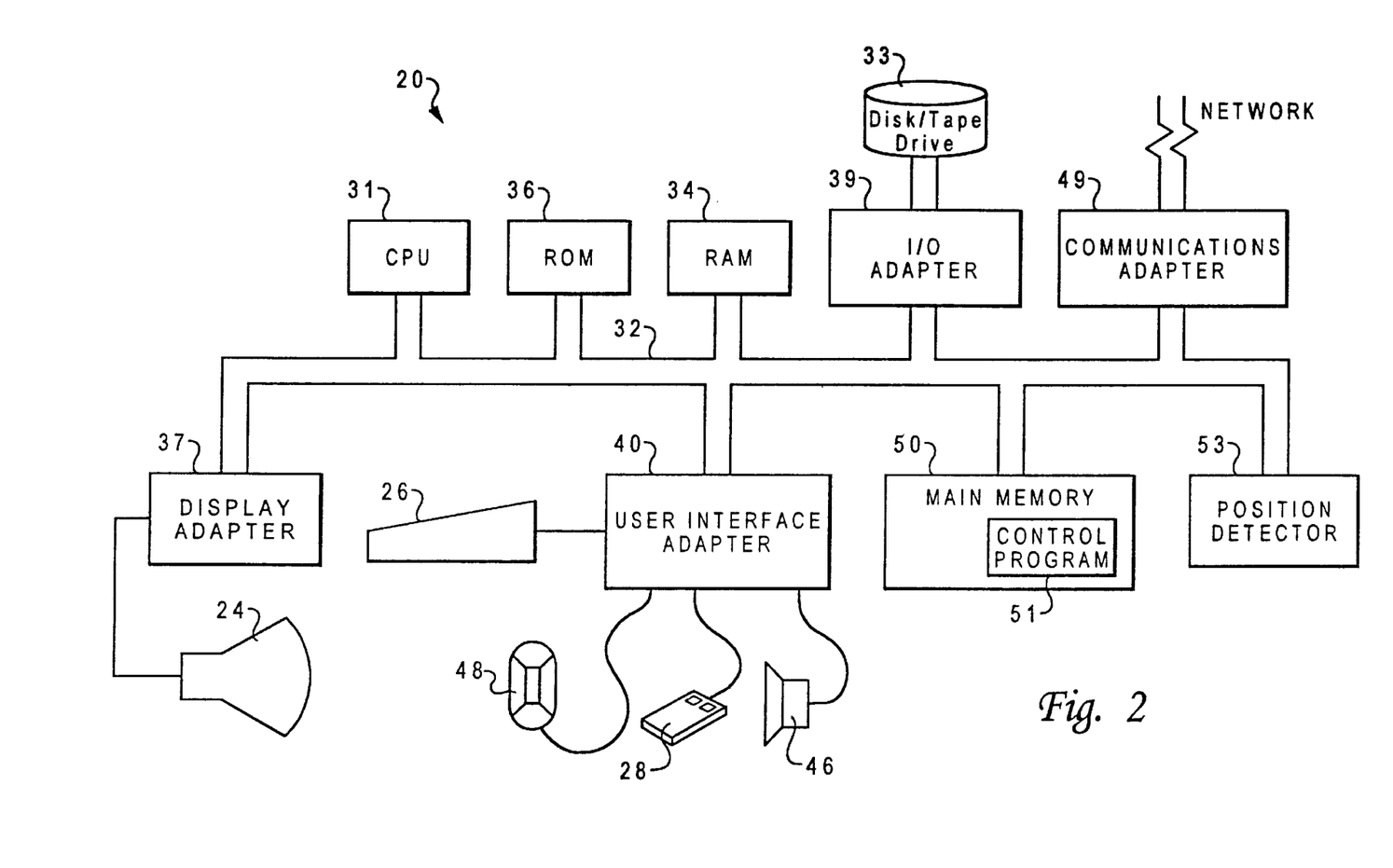
FIG. 2 depicts a representative hardware environment of the computer system illustrated in FIG. 1.

Computer system 20 can be implemented utilizing any suitable computer such as the AS/400 computer system, a product of International Business Machines Corporation (IBM), located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display unit 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display unit 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display unit 24 is the visual output of computer system 20. Video display unit 24 can be a cathode-ray tube (CRT) based video display well-known in the art of computer hardware. However, with a portable or notebook-based computer, video display unit 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIX windows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Computer system 20 also incorporates a position detector 53, which can be utilized to detect the position of mouse 28 with respect to a central location, such as the center of video display unit 24. The position detector may be based on an infrared detection device, well known in the electronic arts. As explained herein, such a position detector determines the position of mouse 28 based on which side of video display unit 24, the mouse is located. Position detector 53 determines whether or not mouse 28 is located to the left or right of a central location. Thus, position detector 53 electronically determines the location of a pointing device with respect to a central location.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
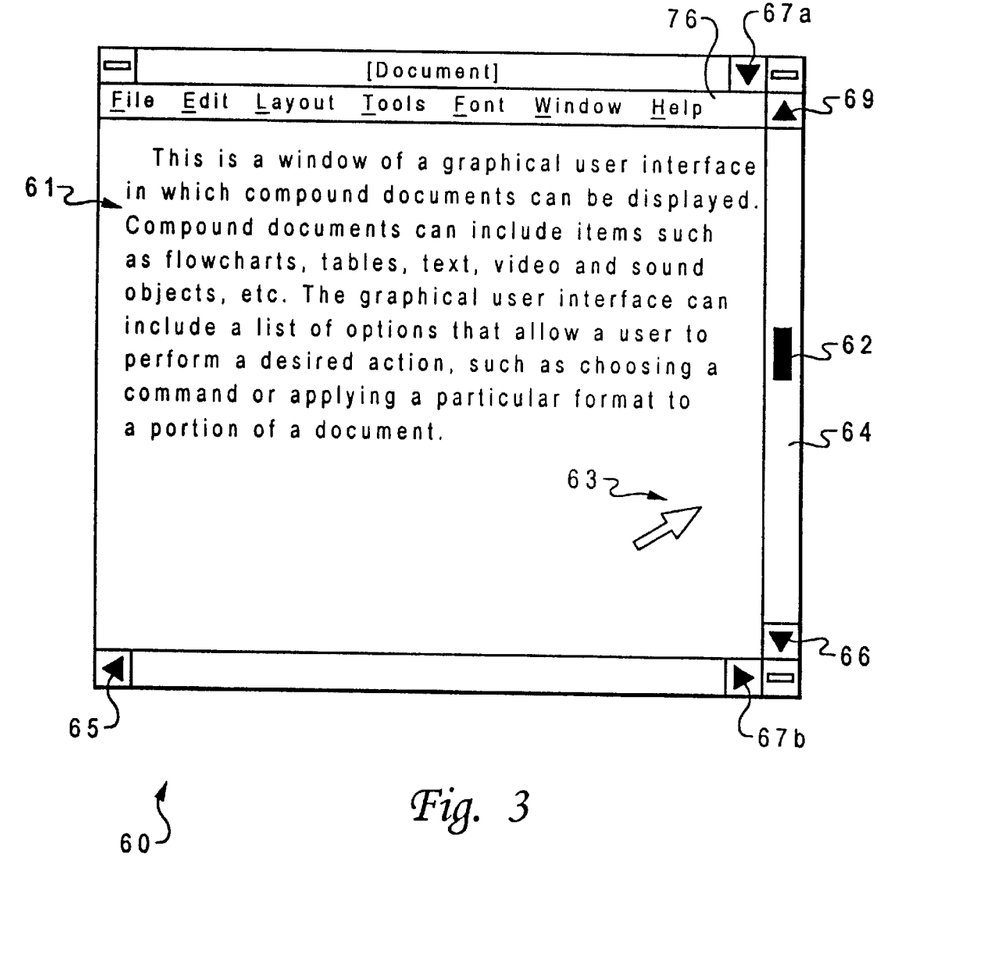
FIG. 3 illustrates a pictorial representation of a graphical user interface window in accordance with the method and system of the present invention.

FIG. 3 illustrates a pictorial representation of a graphical user interface window 60 in accordance with the method and system of the present invention. Window 60 displays a portion of a viewable object, such as a compound document 61. Window 60 is an area on the display screen of a visual display device such as video display 24 of FIG. 1 that is utilized to present a view of an object or to conduct a dialog with a user. Such "windows" can be utilized to present objects, action options, messages, and so forth.

Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can include too large or too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as computer document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a mouse pointer 63 over up-arrow 69 or down-arrow 66 of scroll bar 64 and "click" a button on a pointing device such as a mouse to scroll the document upward or downward, as appropriate. Scrolling in this manner permits viewing of any desired portion of compound document 61. Mouse pointer 63 is an on-screen element whose location changes as the user moves a mouse association with mouse pointer 63. Depending on the location of mouse pointer 63 on a display screen, and the operation of the program within which it is working, the area of the screen where mouse pointer 63 appears serves as the target for an action when the user presses one of the mouse buttons.

Thus, mouse pointer 63, utilized in association with a mouse, allows a user to scroll compound document 61 upward or downward. Scrolling is essentially the electronic equivalent of reading through a rolled (i.e., "scrolled") document rather than flipping through pages of a book. Arrows 65, 67a and 67b can also be utilized by a graphical user interface user to scroll left or right through compound document 61. Scroll bar 64 is thus a graphical user interface window component, associated with a scrollable area, that indicates to a user that more information is available in a particular direction and can be scrolled into view.

In FIG. 3, the graphical user interface window 60 sizes slider 62 within scroll bar 64 according to the number of pages in compound document 61. The length of slider 62 is small with respect to the length of scroll bar 64 because it represents one of many pages of compound document 61. Similarly, the graphical user interface positions slider 62 within scroll bar 64 relative to the viewable position of compound document 61. For example, the graphical user interface positions slider 62 at the top of scroll bar 64 when the user is viewing the first page of compound document 61, and at the bottom of scroll bar 64 when the user is viewing the last page of compound document 61. Slider 62 on scroll bar 64 is defined to have a minimum size.

Figure 4:
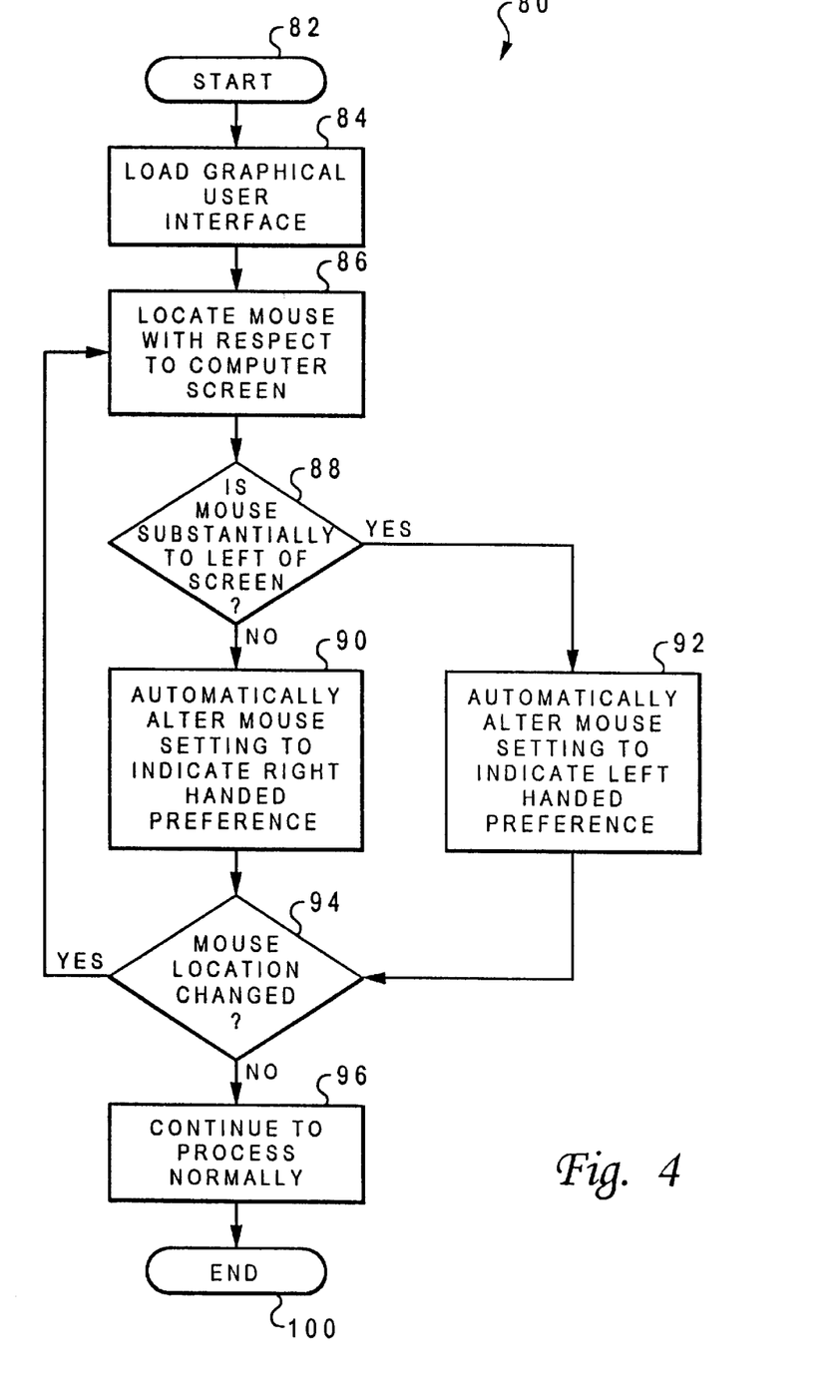
FIG. 4 depicts a flow diagram illustrative of steps utilized to carry out the method and system of the present invention, according to a preferred embodiment of the present invention.

FIG. 4 illustrates a flow diagram 80 that shows steps that can be utilized to carry out the method and system of the present invention, according to a preferred embodiment of the present invention. As illustrated at block 82, the process described in FIG. 4 is initiated. As depicted at block 84, a graphical user interface application program is loaded into a working directory of a data processing system such as computer 20 of FIG. 1 and FIG. 2. The graphical user interface application program includes a sub-application program which allows users to alter mouse settings such as left or right-handed preferences. The data processing system includes a computer screen such as video display unit 24 of FIG. 1 and FIG. 2 and a system unit such as system unit 22 of FIG. 1.

As indicated at block 86, a mouse utilized in accordance with the data processing system is located with respect to the data processing system. As described at block 88, a test is performed to determine whether the mouse is located substantially to the left of the display. In essence, the operation described at block 88, electronically determines whether the mouse is located to the left or right of the monitor (i.e., the display). If it is determined that the mouse is located to the left of the display, the mouse settings are altered to indicate that the mouse preference designation is left-handed, as described at block 92. Of course, those skilled in the art will appreciate that if the mouse setting is already set to indicate a left-handed mouse preference and the mouse is located substantially to the left of the computer screen, the mouse location as an application issue is then moot. In this case, the graphical user interface simply continues to function normally.

If, as indicated at block 88 that the mouse is not located substantially to the left of the computer screen, then as described at block 90, the mouse settings are automatically altered to indicate a right-handed preference. In essence, the operations described herein allow the computer system in which the graphical user interface is running, to "sense" the location of the mouse with respect to particular object, in this case the computer screen. Those skilled in the art will appreciate that such sensing can be accomplished via a number of optical, radio frequency, or magnetic techniques. Assuming the user is utilizing a wireless mouse, as depicted at block 94, a test is then performed to determine whether the mouse location has changed. For example, a user might subsequently decide to change the mouse setting related to right-handed or left-handed preferences. To do so, the user merely moves the mouse into the opposite location (i.e., to a location opposite the present mouse location). If the mouse location has been changed, as indicated at block 94, the operation indicated at block 86 is repeated. If, however, the mouse location remains the same, then as described at block 96, the process (i.e., graphical user interface) continues to function normally with the current mouse settings. As described at block 100, the process then terminates.

It can be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases, the distinction between the method of operations in operating a computer and the method of computation itself should be borne in mind. The present invention relates to method steps for operating a computer, such as computer system 20 depicted in FIG. 1 and FIG. 2 in processing electrical or other (e.g. mechanical, chemical) physical signals to generate other desired physical signals.

Figure 5:
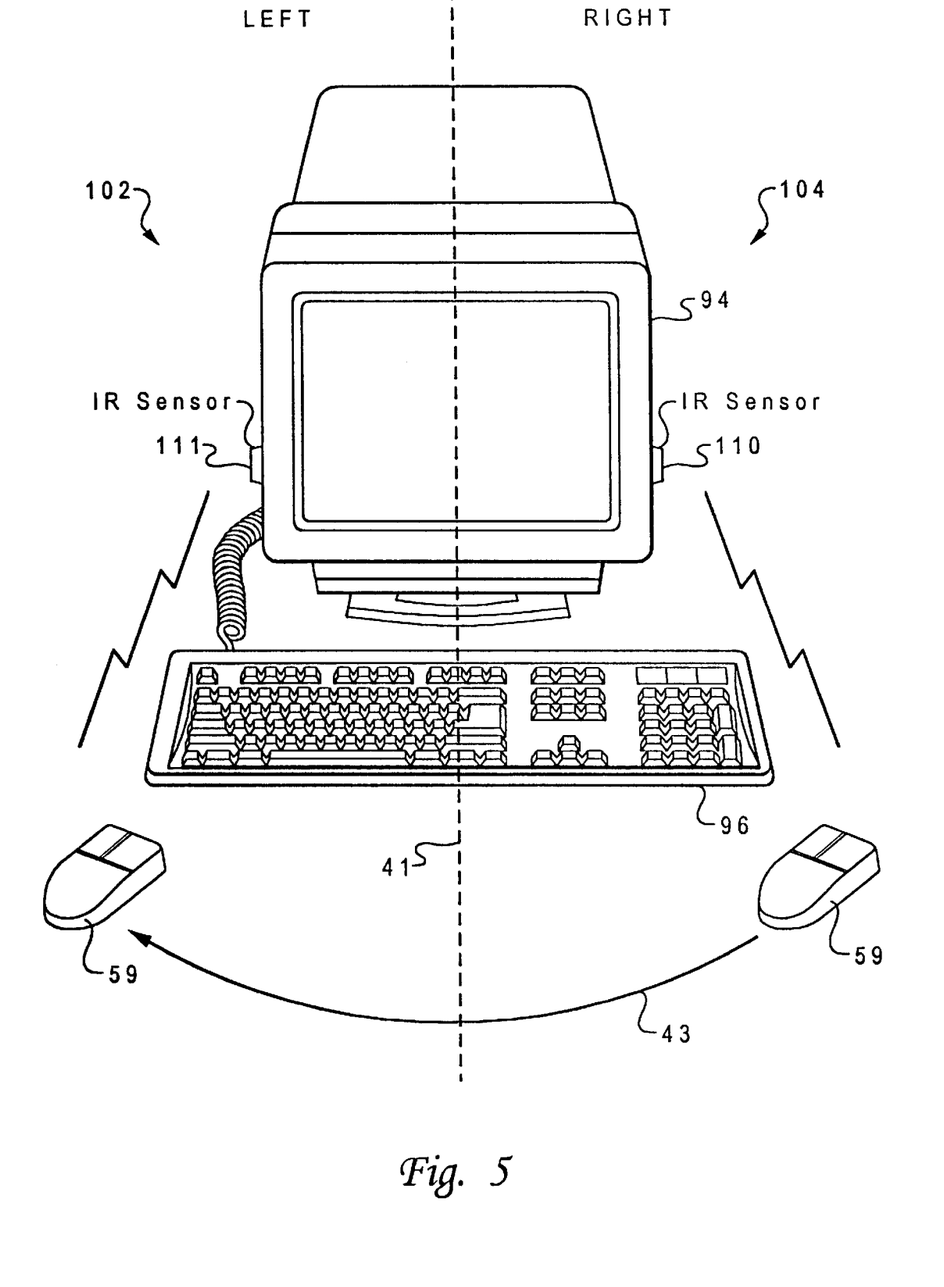
FIG. 5 illustrates a pictorial representation of an ambidextrous mouse, in accordance with a preferred embodiment of the present invention.

FIG. 5 illustrates a pictorial representation of an ambidextrous mouse 59, in accordance with a preferred embodiment of the present invention. Note that in FIG. 5 and FIG. 6, identical parts are referenced by identical reference numerals. Keyboard 96 is coupled to video display unit 94. Video display unit 94 is analogous to video display unit 24 of FIG. 1 and FIG. 2. Video display unit 94 can be coupled to a system unit (not shown) such as system unit 22 of FIG.

1 and FIG. 2. Dashed line 41 indicates a dividing line between a left portion 102 and a right portion 104, not necessarily of equal size. Those skilled in the art will appreciate that left portion 102 and right portion 104 need not necessarily be of equal size. For example, in a preferred embodiment of the present invention, a designer might desire to give the majority of right-handed users the benefit of the doubt and provide for a 45%/55% split.

Mouse 59 is a wireless mouse and communicates with the system unit via infrared communications. Initially, mouse 59 is located within the bounds of right portion 104. Mouse 59, however, is subsequently moved across dashed line 41, which represents the boundary between left portion 102 and right portion 104, and into the area encompassed by left portion 102. Arrow 43 indicates a path of movement from right portion 104 into left portion 102. Assuming that the graphical user interface displayed on video display unit 94 initially is set with a right-handed preference, when mouse 59 is moved into area encompassed by left portion 102, the mouse preferences are automatically altered so that the mouse now acts as a left-handed mouse as opposed to a right-handed mouse. The advantage of such a configuration is that switching the mouse preference is as painless as moving the mouse from one side of the computer screen (i.e., video display unit 94) to the other. Infrared sensors 110 and 111 are located respectively on the right and left sides of video display unit 94. These infrared sensors compose a position detector, such as position detector 53 described in FIG. 2. Infrared sensors 110 and 111 are utilized to determine whether or not mouse 59 is located respectively on the right or left side of video display unit 94. Thus, infrared sensor 111 detects whether or not mouse 59 is located on the left side of video display unit 94, and infrared sensor 110 detectors whether or not mouse 59 is located on the right side of video display unit 94.

Figure 6:
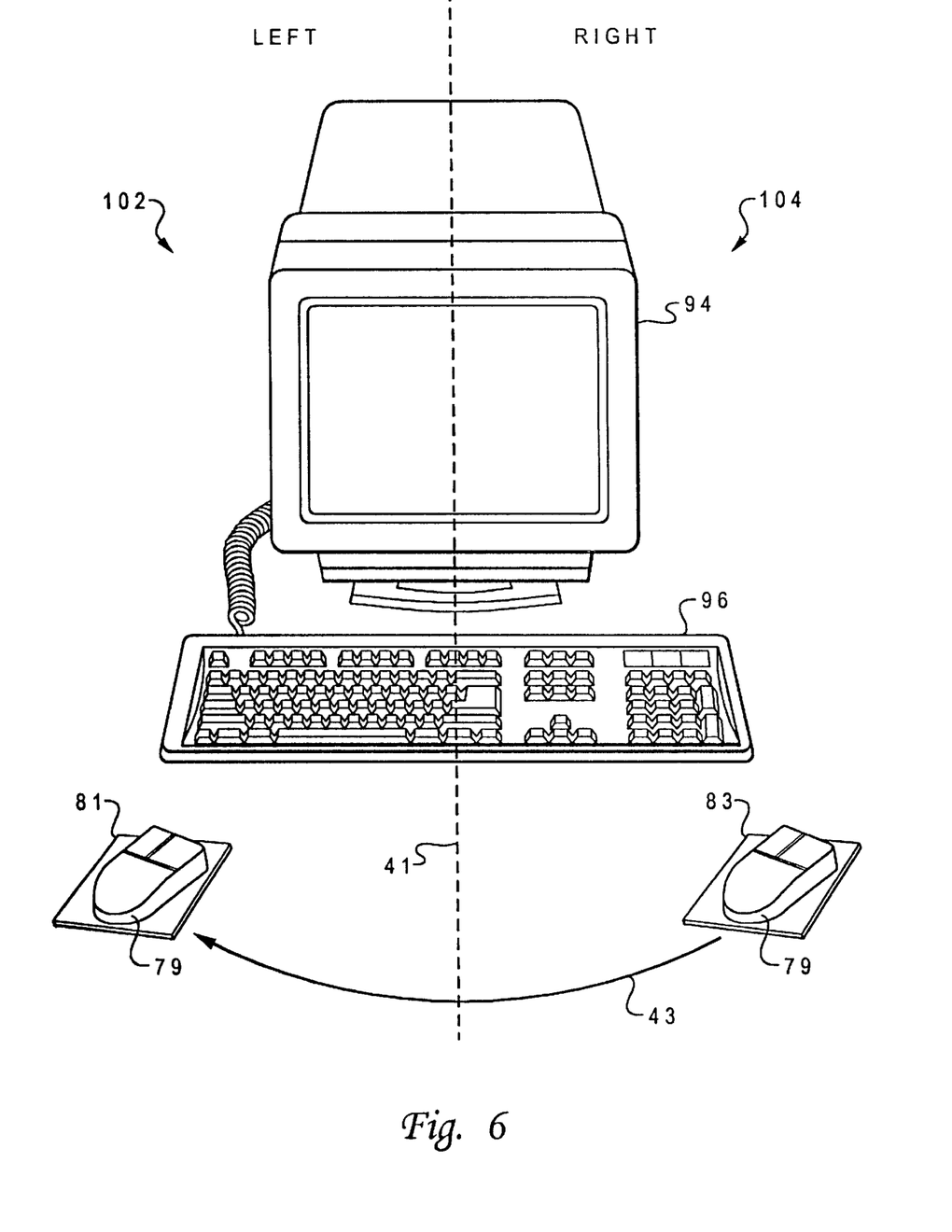
FIG. 6 depicts a pictorial representation of an ambidextrous mouse, in accordance with an alternative preferred embodiment of the present invention.

FIG. 6 depicts a pictorial representation of an ambidextrous mouse 79, in accordance with an alternative preferred embodiment of the present invention. Although cable is not depicted in FIG. 6 which would couple mouse 79 to a system unit such as system unit 22 of FIG. 1 and FIG. 2, for purposes of this discussion assume that mouse 79 is coupled via a cable to a system unit. Those skilled in the art will appreciate that mouse 79 can also be configured as a wireless mouse such mouse 59 of FIG. 5. Mouse 79 initially sits atop a mouse pad 83 within the bounds of right portion 104. Although not depicted in FIG. 6, mouse pad 83 can include a cable coupled to the system unit such that when an object is placed atop mouse pad 83, the system senses that the object is located atop mouse pad 83, which indicates that the mouse is located on the right side of video display unit 94. Mouse pad 83 functions as a right mouse pad.

A left mouse pad—mouse pad 81—is located within the bounds of left portion 102. Similar to mouse pad 83, mouse pad 81 can also include a cable coupled to the system unit such that when an object is placed atop mouse pad 81, the system senses that the object is located atop mouse pad 81, which indicates that mouse 79 is located on the left side of video display unit 94. Thus, each mouse pad includes sensors for indicating whether or not an object is located atop the mouse pad. Assuming that the graphical user interface displayed on video display unit 94 initially is set with a right-handed preference, when mouse 79 is moved from the left mouse pad to the right mouse pad, the mouse preferences are automatically altered so that the mouse now acts as a left-handed mouse as opposed to a right-handed mouse. When the user moves mouse 79 back to mouse pad 83 from mouse pad 81, the settings are again altered, this time to indicate a right handed mouse preference as opposed to a left handed mouse preference. The advantage of such a configuration is that switching the mouse preference is as painless as moving the mouse from one mouse pad to the other.

Those skilled in the art will of course appreciate that other methods can be utilized in accordance with a preferred embodiment of the present invention to toggle the mouse preference from left handed to right handed preferences or vice versa. For example, holding down both mouse buttons for an extra long duration is one method that can be utilized to inform the operating system such mouse preferences should be toggled. Alternatively, an easily accessed external two-position switch can be employed for a somewhat less automated system to retrofit existing computer systems. In addition, other types of position detectors may also be utilized in accordance with a preferred embodiment of the present invention. For example, other types of sensing devices (i.e., position detectors) can be utilized, including devices based on optical, radio frequency or magnetic transducers or sensors.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a computer system having a display and a keyboard for automatically adjusting a pointing device to accommodate both left-handed and right-handed users, wherein said pointing device is utilized in association with a graphical user interface displayed within said computer system, said method comprising the steps of:

electronically determining the location of said pointing device with respect to a central location;

automatically altering said graphical user interface to indicate a left-handed pointing device preference, if said pointing device is located to the left of said central location; and automatically altering said graphical user interface to indicate a right-handed pointing device preference, if said pointing device is located to the right of said central location.

2. The method of claim 1 wherein the step of electronically determining the location of said pointing device with respect to a central location, further comprises the step of:

electronically determining the location of said pointing device with respect to a central location such that said pointing device comprises a mouse.

3. The method of claim 2 wherein the step of electronically determining the location of said pointing device with respect to a central location, further comprises the step of:

electronically determining the location of said pointing device with respect to a central location, such that said central location comprises said display.

4. The method of claim 2 wherein the step of electronically determining the location of said pointing device with respect to a central location, further comprises the step of:

electronically determining the location of said pointing device with respect to a central location, such that said central location comprises said keyboard.

5. The method of claim 2 wherein the step of electronically determining the location of said pointing device with respect to a central location, further comprises the step of:

electronically determining via electronic sensors the location of said pointing device with respect to a central location.

6. The method of claim 5 wherein the step of electronically determining the location of said pointing device with respect to a central location, further comprises the step of:

electronically determining via electronic sensors comprising infrared sensors, the location of said pointing device with respect to a central location.

7. A system for automatically adjusting a pointing device to accommodate both left-handed and right-handed users, such that said pointing device is utilized in association with a graphical user interface displayed within a computer system having a display and keyboard, said method comprising the steps of:

means for electronically determining the location of said pointing device with respect to a central location;

means for automatically altering said graphical user interface to indicate a left-handed pointing device preference, if said pointing device is located to the left of said central location; and means for automatically altering said graphical user interface to indicate a right-handed pointing device preference, if said pointing device is located to the right of said central location.

8. The system of claim 7 wherein the step of electronically determining the location of said pointing device with respect to a central location, further comprises the step of:

means for electronically determining the location of said pointing device with respect to a central location such that said pointing device comprises a mouse.

9. The system of claim 8 wherein the step of electronically determining the location of said pointing device with respect to a central location, further comprises the step of:

means for electronically determining the location of said pointing device with respect to a central location, such that said central location comprises said display.

10. The system of claim 8 wherein the step of electronically determining the location of said pointing device with respect to a central location, further comprises the step of:

means for electronically determining the location of said pointing device with respect to a central location, such that said central location comprises said keyboard.

11. The system of claim 8 wherein the step of electronically determining the location of said pointing device with respect to a central location, further comprises the step of:

means for electronically determining via electronic sensors the location of said pointing device with respect to a central location.

12. The system of claim 11 wherein the step of electronically determining the location of said pointing device with respect to a central location, further comprises the step of:

means for electronically determining via electronic sensors comprising infrared sensors, the location of said pointing device with respect to a central location.

13. A program product residing in computer memory in a computer system for automatically adjusting a pointing device to accommodate both left-handed and right-handed users, wherein said computer system includes a display and a keyboard such that said pointing device is utilized in association with a graphical user interface displayed within said computer system, said program product comprising:

instruction means residing within a computer system for electronically determining the location of said pointing device with respect to a central location;

instruction means residing within a computer system for automatically altering said graphical user interface to indicate a left-handed pointing device preference, if said pointing device is located to the left of said central location; and instruction means residing within a computer system for automatically altering said graphical user interface to indicate a right-handed pointing device preference, if said pointing device is located to the right of said central location.

14. The program product of claim 13 wherein said instruction means residing within a computer system for electronically determining the location of said pointing device with respect to a central location, further comprises:

instruction means residing within a computer system for electronically determining the location of said pointing device with respect to a central location such that said pointing device comprises a mouse.

15. The program product of claim 14 wherein said instruction means residing within a computer system for electronically determining the location of said pointing device with respect to a central location, further comprises:

instruction means residing within a computer system for electronically determining the location of said pointing device with respect to a central location, such that said central location comprises said display.

16. The program product of claim 14 wherein said instruction means residing within a computer system for electronically determining the location of said pointing device with respect to a central location, further comprises:

instruction means residing within a computer system for electronically determining the location of said pointing device with respect to a central location, such that said central location comprises said keyboard.

17. The program product of claim 14 wherein said instruction means residing within a computer system for electronically determining the location of said pointing device with respect to a central location, further comprises:

instruction means residing within a computer system for electronically determining via electronic sensors the location of said pointing device with respect to a central location.

18. The program product of claim 17 wherein said instruction means residing within a computer system for electronically determining the location of said pointing device with respect to a central location, further comprises:

instruction means residing within a computer system for electronically determining via electronic sensors comprising infrared sensors, the location of said pointing device with respect to a central location.

19. The program product of claim 14 wherein each of said instruction means further comprises signal bearing media.

20. The program product of claim 19 wherein said signal bearing media further comprises recordable media.

21. The program product of claim 19 wherein said signal bearing media further comprises transmission media.

\* \* \* \* \*